(12) United States Patent  (10) Patent No.: US 10,764,831 B2
Li et al.                  (45) Date of Patent:     Sep. 1, 2020

(54) DATA TRANSMISSION METHOD AND TERMINAL DEVICE THEREOF

(71) Applicant: HUAWEI TECHNOLOGIES CO., LTD., Shenzhen, Guangdong (CN)

(72) Inventors: Chao Li, Beijing (CN); Xingwei Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/368,712

(22) Filed: Mar. 28, 2019

(65) Prior Publication Data

US 2019/0289554 A1   Sep. 19, 2019

Related U.S. Application Data

(63) Continuation of application No. PCT/CN2016/100945, filed on Sep. 29, 2016.

(51) Int. Cl.
*H04W 52/06* (2009.01)
*H04L 5/00* (2006.01)
(Continued)

(52) U.S. Cl.
CPC .......... *H04W 52/06* (2013.01); *H04L 5/0044* (2013.01); *H04L 5/0048* (2013.01); *H04W 52/00* (2013.01);
(Continued)

(58) Field of Classification Search
CPC . H04W 52/06; H04W 52/346; H04W 52/383; H04W 52/367; H04W 52/325; H04W 52/146; H04W 52/00; H04W 4/40; H04W 52/36; H04W 24/02; H04W 72/02; H04W 72/0413; H04W 72/0453;
(Continued)

(56) References Cited

U.S. PATENT DOCUMENTS

2011/0243012 A1    10/2011  Luo et al.
2011/0319120 A1*   12/2011  Chen .................. H04W 52/367
                                                          455/522
(Continued)

FOREIGN PATENT DOCUMENTS

CN    102835059 A    12/2012
CN    104350790 A     2/2015
(Continued)

OTHER PUBLICATIONS

Office Action issued in Chinese Application No. 201910316660.3 dated Dec. 18, 2019, 7 pages.
(Continued)

*Primary Examiner* — Shaima Q Aminzay
(74) *Attorney, Agent, or Firm* — Fish & Richardson P.C.

(57) ABSTRACT

A data transmission method includes: obtaining, by user equipment (UE), a maximum transmit power; determining, by the UE, a transmit power of a data channel and/or a transmit power of a control channel based on the maximum transmit power and a first parameter, where the first parameter includes at least one of the following: a bandwidth of the data channel, a bandwidth of the control channel, or a carrier type of a carrier of a first link; and sending, by the UE, the control channel and the data channel in a same subframe.

20 Claims, 5 Drawing Sheets

(51) Int. Cl.
- *H04W 52/34* (2009.01)
- *H04W 52/38* (2009.01)
- *H04W 52/36* (2009.01)
- *H04W 52/32* (2009.01)
- *H04W 52/14* (2009.01)
- *H04W 52/00* (2009.01)

(52) U.S. Cl.
CPC ....... *H04W 52/146* (2013.01); *H04W 52/325* (2013.01); *H04W 52/346* (2013.01); *H04W 52/367* (2013.01); *H04W 52/383* (2013.01); *Y02D 70/00* (2018.01)

(58) Field of Classification Search
CPC . H04W 72/0473; H04W 36/38; H04W 88/16; H04W 64/00; H04W 68/02; H04W 72/04; H04W 72/042; H04W 72/0446; H04W 72/048; H04W 76/10; H04W 88/02; H04L 5/0044; H04L 5/0048; Y02D 70/00
USPC ...................................................... 455/522
See application file for complete search history.

(56) References Cited

U.S. PATENT DOCUMENTS

| | | |
|---|---|---|
| 2013/0324182 A1 | 12/2013 | Deng et al. |
| 2015/0327183 A1 | 11/2015 | Park |
| 2016/0219532 A1 | 7/2016 | Li et al. |
| 2018/0176871 A1 | 6/2018 | Li |

FOREIGN PATENT DOCUMENTS

| | | |
|---|---|---|
| CN | 104936297 A | 9/2015 |
| JP | 2013535863 A | 9/2013 |
| JP | 2015519028 A | 7/2015 |
| WO | 2014018333 A2 | 1/2014 |
| WO | 2016008138 A1 | 1/2016 |

OTHER PUBLICATIONS

R1-160735—Huawei, HiSilicon, "Power control for V2V," 3GPP TSG RAN WG1 Meeting #84, St Julian's, Malta, Feb. 15-19, 2016, 6 pages.
R1-164855—Huawei, HiSilicon, "Power control for V2V," 3GPP TSG RAN WG1 Meeting #85 ,Nanjing, China, May 23-27, 2016, 8 pages.
Search Report issued in Chinese Application No. 201910316660.3 dated Dec. 6, 2019, 3 pages.
International Search Report and Written Opinion issued in International Application No. PCT/CN2016/100945 dated Jun. 16, 2017, 21 pages.
Extended European Search Report issued in European Application No. 16917224.4 dated Aug. 20, 2019, 7 pages.
R1-156429—Huawei et al., "Power control for V2V," 3GPP TSG RAN WG1 Meeting #83, Anaheim, USA; Nov. 15-22, 2015, XP051002895, 4 pages.
R1-166206—Huawei et al., "Power control for SA and data," 3GPP TSG RAN WG1 Meeting #86, Gothenburg, Sweden, Aug. 22-26, 2016, XP051140114, 3 pages.
Huawei, HiSilicon, "Discussion on the remaining issues for sidelink power control[online], "3GPP TSG RAN WG1 Meeting #86bis, R1-1609373; Lisbon, Portugal, Oct. 14, 2016, 3 pages.
Office Action issued in Japanese Application No. 2019-516994 on Apr. 28, 2020, 13 pages (with English translation).

\* cited by examiner

DATA TRANSMISSION METHOD AND TERMINAL DEVICE THEREOF

CROSS-REFERENCE TO RELATED APPLICATION

This application is a continuation of International Application No. PCT/CN2016/100945, filed on Sep. 29, 2016, the disclosure of which is hereby incorporated by reference in its entirety.

TECHNICAL FIELD

Embodiments of the present invention relate to the communications field, and more specifically, to a data transmission method and a terminal device thereof.

BACKGROUND

In recent years, with development of intelligent technologies, technologies such as intelligent transportation and unmanned driving have attracted more attention. A technology and a standard of the Internet of Vehicles are crucial to developing the foregoing industries. According to the Internet of Vehicles technology, vehicle-to-everything (V2X) communication includes vehicle-to-vehicle (V2V) communication, vehicle-to-infrastructure (V2I) communication, vehicle-to-pedestrian (V2P) communication, pedestrian-to-vehicle (P2V) communication, and the like. A basic problem in V2X communication is how to achieve efficient communication between vehicles and various devices in various complex environments, especially to improve communication reliability and reduce a communication delay.

The 3rd Generation Partnership Project (3rd Generation Partnership Project, 3GPP) recommends that the Internet of Vehicles be researched based on the existing device-to-device (D2D) protocol. However, in the existing D2D protocol, control information and data information that are used for V2X communication are transmitted at different time, leading to an additional delay. In research of V2X communication, it is recommended that the control information and the data information be sent in a same subframe to reduce the delay. However, this causes a new problem of how to allocate a transmit power between a control channel and a data channel of V2X communication.

SUMMARY

An embodiment of the present invention provides a data transmission method, to effectively allocate transmit powers for control information and data information.

According to a first aspect, a data transmission method is provided, where the method includes: obtaining, by user equipment UE, a maximum transmit power; determining, by the UE, a transmit power of a data channel and/or a transmit power of a control channel based on the maximum transmit power and a first parameter, where the first parameter includes at least one of the following: a bandwidth of the data channel, a bandwidth of the control channel, or a carrier type of a carrier of a first link; and sending, by the UE, the control channel and the data channel in a same subframe.

Therefore, in this embodiment of the present invention, when the data channel and the control channel are sent in the same subframe, the transmit power of the data channel and the transmit power of the control channel can be determined based on at least one of the maximum transmit power, the bandwidth of the data channel, the bandwidth of the control channel, or the carrier type of the carrier of the first link, to properly determine the transmit powers of control information and data.

With reference to the first aspect, in a first possible implementation of the first aspect, the determining, by the UE, a transmit power of a data channel and/or a transmit power of a control channel based on the maximum transmit power and a first parameter includes: determining a power scaling factor based on a proportional relationship between a first power and the maximum transmit power, where the first power is a sum of a second power of the data channel and a third power of the control channel, the second power is determined based on the bandwidth of the data channel and/or the bandwidth of the control channel included in the first parameter, and the third power is determined based on the bandwidth of the data channel and/or the bandwidth of the control channel included in the first parameter; and determining the transmit power of the control channel and/or the transmit power of the data channel based on the scaling factor.

Therefore, this embodiment of the present invention can provide a transmit power allocation method for a data channel and a control channel that are sent in a same subframe, and provides a power allocation method used when a maximum transmit power is limited.

With reference to the first aspect and the foregoing implementation of the first aspect, in a second possible implementation of the first aspect, the determining a power scaling factor based on a proportional relationship between a first power and the maximum transmit power includes: determining a ratio of the maximum transmit power to the first power; and determining a smaller value of the ratio and 1 as a value of the scaling factor.

With reference to the first aspect and the foregoing implementations of the first aspect, in a third possible implementation of the first aspect, the determining the transmit power of the control channel and/or the transmit power of the data channel based on the power scaling factor includes: using a product of the power scaling factor and the second power as the transmit power of the data channel; and/or using a product of the power scaling factor and the third power as the transmit power of the control channel.

With reference to the first aspect and the foregoing implementations of the first aspect, in a fourth possible implementation of the first aspect, the first parameter includes the transmission bandwidth of the control channel and the transmission bandwidth of the data channel, and the determining, by the UE, a transmit power of a data channel and/or a transmit power of a control channel based on the maximum transmit power and a first parameter includes: determining whether a first power is greater than the maximum transmit power, where the first power is a sum of a second power of the data channel and a third power of the control channel; and when the first power is greater than the maximum transmit power, determining the transmit power of the data channel based on the maximum transmit power, the transmission bandwidth of the control channel, and the transmission bandwidth of the data channel; and/or determining the transmit power of the control channel based on the maximum transmit power, the transmission bandwidth of the control channel, and the transmission bandwidth of the data channel; or determining the transmit power of the control channel based on the transmit power of the data channel, the transmission bandwidth of the control channel, and the transmission bandwidth of the data channel.

With reference to the first aspect and the foregoing implementations of the first aspect, in a fifth possible implementation of the first aspect, the determining, by the UE, a transmit power of a data channel and/or a transmit power of a control channel based on the maximum transmit power and a first parameter includes: determining the transmit power of the control channel and/or the transmit power of the data channel based on a sum of the maximum transmit power and a first additional item, where the first additional item is determined based on the bandwidth of the control channel and the bandwidth of the data channel.

With reference to the first aspect and the foregoing implementations of the first aspect, in a sixth possible implementation of the first aspect, the determining, by the UE, a transmit power of a data channel and/or a transmit power of a control channel based on the maximum transmit power and a first parameter includes: determining whether a first power is greater than the maximum transmit power, where the first power is a sum of a second power of the data channel and a third power of the control channel; and when the first power is greater than the maximum power, determining the transmit power of the data channel based on a scaling factor and the second power, and determining the transmit power of the control channel based on the scaling factor and the third power, where the scaling factor is not greater than a ratio of the maximum transmit power to the first power.

With reference to the first aspect and the foregoing implementations of the first aspect, in a seventh possible implementation of the first aspect, the maximum transmit power is one of the following: a maximum transmit power or a maximum available transmit power of the UE; a maximum transmit power or a maximum available transmit power on all carriers in the uplink subframe; a maximum transmit power or a maximum available transmit power on a current carrier in the subframe; a maximum transmit power configured on or indicated by the control channel or the data channel; and a maximum transmit power value configured by a base station or a predefined maximum transmit power value.

With reference to the first aspect and the foregoing implementations of the first aspect, in an eighth possible implementation of the first aspect, before the determining, by the UE, a transmit power of a data channel and a transmit power of a control channel based on the maximum transmit power and a first parameter, the method further includes:

determining that the carrier of the first link is a first-type carrier.

It should be understood that, when the carrier of the first link is determined to be the first-type carrier, any one of the first aspect, or the first to the seventh possible implementations of the first aspect is executed.

With reference to the first aspect and the foregoing implementations of the first aspect, in a ninth possible implementation of the first aspect, the first parameter includes the carrier type of the carrier of the first link, and the determining, by the UE, a transmit power of a data channel and a transmit power of a control channel based on the maximum transmit power and a first parameter includes: when the carrier of the first link is a second-type carrier, determining the maximum transmit power of the data channel as the transmit power of the data channel; and/or determining the transmit power of the control channel based on the transmit power of the data channel, the bandwidth of the data channel, and the bandwidth of the control channel; or determining the maximum transmit power of the control channel as the maximum transmit power of the control channel.

With reference to the first aspect and the foregoing implementations of the first aspect, in a tenth possible implementation of the first aspect, the first-type carrier is determined based on at least one of the following characteristics: the carrier of the first link includes the first link and a second link; the carrier of the first link includes a reference signal used for determining a power control parameter; the type of the carrier of the first link is determined to be the first-type carrier based on indication information; or indication information for determining a transmit power parameter of the carrier of the first link is included.

With reference to the first aspect and the foregoing implementations of the first aspect, in an eleventh possible implementation of the first aspect, the second-type carrier is determined based on at least one of the following characteristics: the carrier of the first link includes only first transmission; the carrier of the first link does not include the reference signal used for determining the power control parameter; the indication information for determining the transmit power parameter of the carrier of the first link is not included; or the type of the carrier of the first link is determined to be the second-type carrier based on the indication information.

With reference to the first aspect and the foregoing implementations of the first aspect, in a twelfth possible implementation of the first aspect, the second power value of the data channel is a power value determined based on a path loss between the UE and a serving cell; or the second power value of the data channel is a smaller value of the maximum power value on the data channel and a power value determined based on a path loss between the UE and a serving cell; or the third power of the control channel is a power value of the control channel determined based on the path loss between the UE and the serving cell; or the third power of the control channel is a power value determined based on the power value of the data channel and the bandwidths of the data channel and the control channel; or the third power value of the control channel is the smaller value of the maximum power value on the data channel and the power value of the data channel determined based on the path loss between the UE and the serving cell.

According to a second aspect, a terminal device is provided, configured to execute the method in the first aspect or any possible implementation of the first aspect. Specifically, the terminal device includes a unit for executing the method in the first aspect or any possible implementation of the first aspect.

According to a third aspect, an apparatus is provided, where the apparatus includes a transceiver, a memory, a processor, and a bus system. The transceiver, the memory, and the processor are connected by using the bus system, the memory is configured to store an instruction, and the processor is configured to execute the instruction stored in the memory, to control the transceiver to receive and/or send a signal. When the processor executes the instruction stored in the memory, the processor executes the method in the first aspect or any possible implementation of the first aspect.

According to a fourth aspect, a computer program product is provided, where the computer program product includes computer program code. When the computer program code is executed by a receiving unit, a processing unit, and a sending unit or a receiver, a processor, and a transmitter of a terminal device, the terminal device executes any data transmission method in the first aspect and implementations of the first aspect.

According to a fifth aspect, a computer readable storage medium is provided, where the computer readable storage medium stores a program, and the program enables user equipment to execute any data transmission method in the first aspect and implementations of the first aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
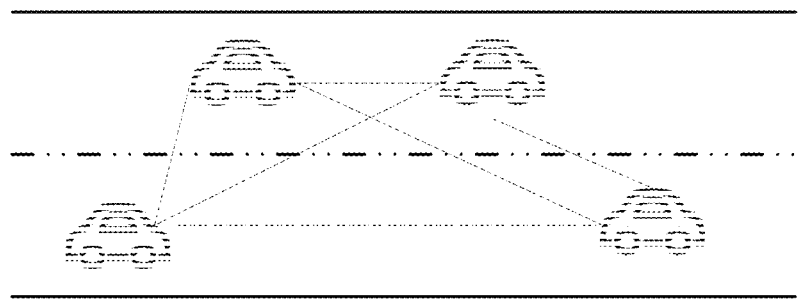
FIG. 1 is a schematic diagram of a V2V communication scenario according to an embodiment of the present invention.

FIG. 1 is a schematic diagram of a V2V communication scenario according to an embodiment of the present invention. FIG. 1 is a schematic diagram of communication between four vehicles on lanes.

In V2V communication, assisted driving and automated driving may be implemented through wireless communication among a plurality of on-board units (on-board unit, OBU), thereby effectively improving traffic efficiency, preventing traffic accidents, and reducing a driving risk.

Figure 2:
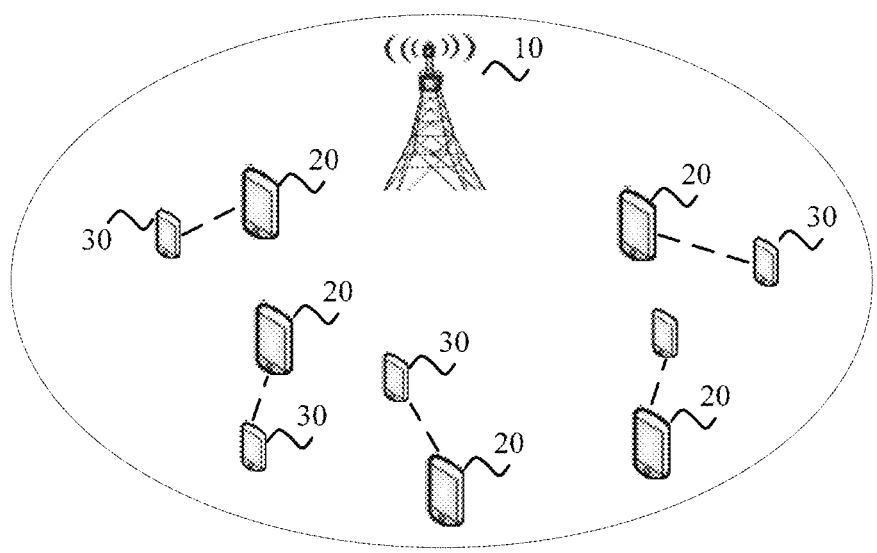
FIG. 2 is a schematic diagram of an application scenario according to an embodiment of the present invention.
Figure 3:
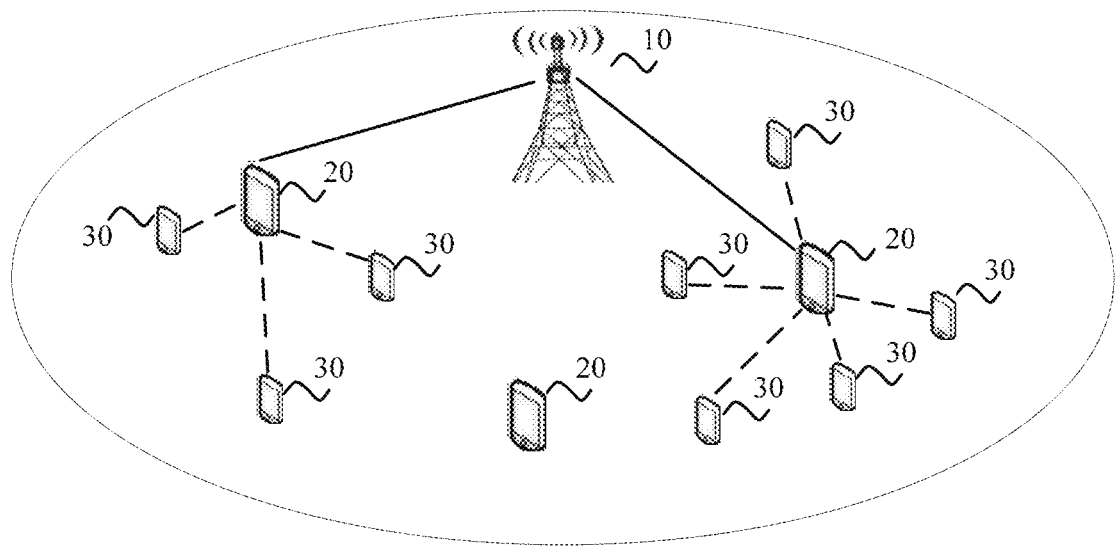
FIG. 3 is another schematic diagram of an application scenario according to an embodiment of the present invention.

FIG. 2 and FIG. 3 are schematic diagrams of application scenarios according to embodiments of the present invention. In FIG. 2 and FIG. 3, UE 20 can communicate directly with a base station 10, and the UE 20 may be referred to as relay (relay) UE. UE 30 may not be able to communicate directly with the base station 10, but the UE 30 can communicate with the UE 20, and therefore the UE 30 can implement communication with the base station 10 by using the UE 20. The UE 30 may be referred to as remote UE.

In FIG. 2, a communication distance between the UE 20 and the UE 30 that can communicate with the UE 20 is relatively short, for example, approximately 10 meters (m). In FIG. 3, a communication distance between the UE 20 and the UE 30 that can communicate with the UE 20 is relatively long, for example, approximately from 100 m to 1000 m.

Figure 4:
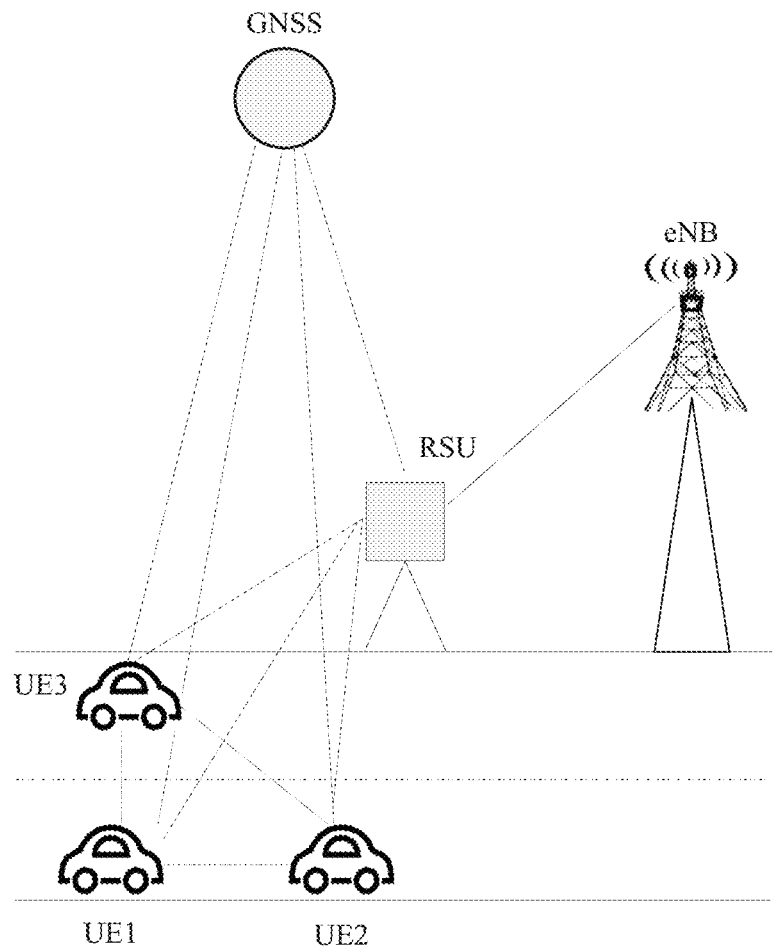
FIG. 4 is another schematic diagram of an application scenario according to an embodiment of the present invention.

Based on the schematic scenarios of FIG. 2 and FIG. 3, FIG. 4 is a schematic diagram of a practical application scenario according to an embodiment of the present invention. An evolved NodeB (eNB) in FIG. 4 is equivalent to the base station 10 in FIG. 2 and FIG. 3. A roadside unit (RSU), UE1, UE2, and UE3 in FIG. 4 may be the UE 20 and the UE 30 in FIG. 2 and FIG. 3. For example, the RSU is the UE 20, and can communicate directly with the eNB; and the UE1, the UE2, and the UE3 are UEs 30, and can communicate with the eNB by using the RSU. In addition, FIG. 4 further shows the Global Navigation Satellite System (Global Navigation Satellite System, GNSS), which may be used to provide information such as positioning information for another network element.

The RSU may function as a vehicular device, or may function as an eNB. The UE1, the UE2, and the UE3 may be vehicular devices, and may perform V2V communication with each other by using a sidelink. A vehicular device moves at a high speed along with a vehicle. For example, a relative moving speed is largest when the UE1 and the UE2 move relative to each other.

The devices shown in FIG. 4 may use a spectrum of a cellular link during communication, or may use an intelligent transportation spectrum near 5.9 GHz. A technology for mutual communication between the devices may be enhanced based on the LTE protocol, or may be enhanced by using a D2D technology.

In this embodiment of the present invention, the sidelink may be a communication link between UE and UE. The sidelink is also referred to as a D2D link in D2D communication, or referred to as a PC5 link in some other scenarios. In the Internet of Vehicles, the sidelink may also be referred to as a V2V link, a vehicle-to-infrastructure (V2I) link, a vehicle-to-pedestrian (V2P) link, or the like. The sidelink may send information in any of the following forms: broadcast, unicast, multicast and groupcast. The sidelink may use the spectrum of the cellular link, for example, use an uplink spectrum of the cellular link.

In this embodiment of the present invention, the UE may also be referred to as a terminal, and may include an OBU on a vehicle, the roadside RSU, a mobile phone used by a pedestrian, or the like.

Figures 5A, 5B:
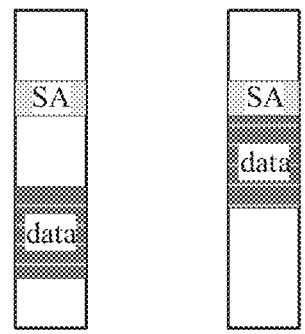
FIG. 5($a$) and FIG. 5($b$) are a schematic diagram showing that a scheduling assignment (SA) and data are in a same subframe according to an embodiment of the present invention.

In V2V communication, it is recommended that control information (for example, an SA) and data be sent in a same subframe, as shown in FIGS. 5A and 5B. In FIG. 5A, the SA and the data are in non-adjacent frequency-domain locations in the same subframe. In FIG. 5B, the SA and the data are in adjacent frequency-domain locations in the same subframe. In other words, frequency-domain locations of the SA and the data may be adjacent or non-adjacent. In addition, the SA may be carried in an independent physical channel, such as a physical sidelink control channel (PSCCH). Alternatively, the SA and the data may be carried in a same physical channel, such as a physical sidelink shared channel (PSSCH).

In the D2D protocol of Rel-12, a channel carrying the SA is also referred to as a PSCCH channel, which is used for transmitting control information among UEs. The control information is used to indicate to a receiver, parameter information such as a location of a time-frequency resource, a resource size, and a modulation and coding scheme (MCS)

value for transmitting the data part. In the D2D of Rel-12, the SA and the data are sent in different subframes, so that transmit powers of the SA and the data may be separately configured in corresponding subframes.

It should be noted that duration occupied by one subframe is generally 1 millisecond (ms) in a current LTE system, and that the duration of one subframe is not limited in this embodiment of the present invention. Specifically, in this embodiment of the present invention, the duration of one subframe may be most basic duration occupied by one transmission, and the duration of one subframe may be predefined duration. For example, the duration of one subframe may be 1 ms, may be greater than 1 ms, such as 2 ms or 10 ms, or may be less than 1 ms, such as 0.625 ms, 0.125 ms, or 0.2 ms.

Parallel transmission of the SA and the data is based on a multi-carrier system. For a transmitter, a total available transmit power in one subframe is fixed. For example, the total available transmit power does not exceed a maximum transmit power of UE. In a scenario in which the SA and the data are sent in the same subframe, when a base station instructs the user equipment (UE) to use the maximum transmit power, if the maximum transmit power is used for the SA, there is no available transmit power for the data; and vice versa.

This embodiment of the present invention is intended to resolve a problem of how to determine transmit powers of a data channel and a control channel when the UE needs to transmit the SA and the data in the same subframe, and particularly, how to determine transmit powers for the control information and the data when the UE uses the maximum transmit power.

A first link indicates a communication link between UEs, and may be a D2D link, a V2X link, a sidelink, or the like. For example, the first link may be a link between the UE 20 and the UE 30 in FIG. 2 or FIG. 3, or may be a link between the RSU and the UE3 in FIG. 4. Communication on the first link may be performed in any of the following manners: unicast, groupcast, and broadcast.

A second link indicates a communication link between UE and the base station, and may be a cellular link. For example, the second link may be a link between the UE 20/UE 30 and the base station 10 in FIG. 2 or FIG. 3, or may be a link between the RSU and the eNB in FIG. 4.

Relay UE indicates UE that can communicate directly with the base station, and can forward data from another UE to the base station. For example, the relay UE may be the UE 20 in FIG. 2 or FIG. 3, or may be the RSU in FIG. 4.

Remote UE indicates UE that may not be able to communicate directly with the base station but can communicate with the base station by using the relay UE. For example, the remote UE may be the UE 30 in FIG. 2 or FIG. 3, or may be the UE1, the UE2, or the UE3 in FIG. 4.

Figure 6:
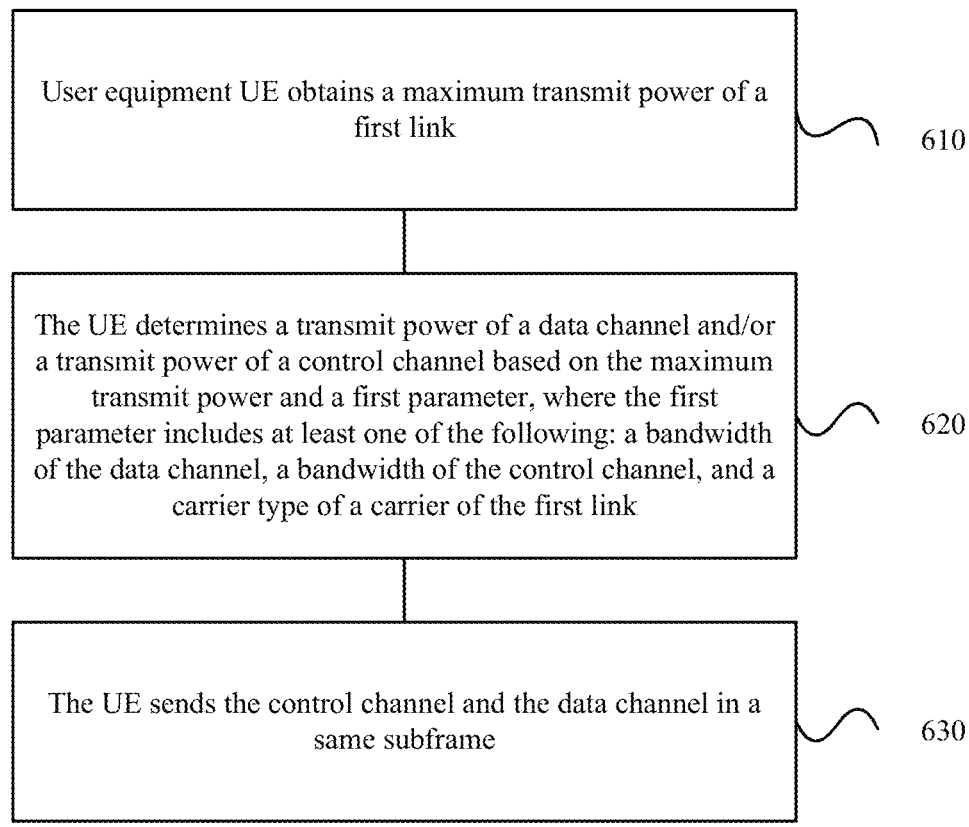
FIG. 6 is a flowchart of a method for determining a transmit power according to an embodiment of the present invention.

FIG. 6 is a schematic flowchart of a method according to an embodiment of the present invention. The method is executed by UE, which may be the foregoing relay UE, or may be the foregoing remote UE. As shown in FIG. 6, the method 600 includes the following steps.

Step 610. The user equipment UE obtains a maximum transmit power of a first link.

Step 620. The UE determines a transmit power of a data channel and/or a transmit power of a control channel based on the maximum transmit power and a first parameter.

The first parameter includes at least one of the following: a bandwidth of the data channel, a bandwidth of the control channel, or a carrier type of a carrier of the first link.

Step 630. The UE sends the control channel and the data channel in a same subframe.

In step 610, the maximum transmit power of the first link is a threshold of an allowed transmit power of the first link. No matter how the UE allocates the transmit powers of the control channel and the data channel, a sum of the transmit power of the control channel and the transmit power of the data channel should not exceed the allowed maximum transmit power of the first link.

The maximum transmit power is represented as $P_{CMAX,c}$ or $\hat{P}_{CMAX,c}$, and has any of the following meanings:

a maximum transmit power or a maximum available transmit power on the UE side;

a maximum transmit power or a maximum available transmit power on all carriers in the current subframe;

a maximum transmit power or a maximum available transmit power on a current carrier in the current subframe; or a maximum transmit power level of the UE; or the first maximum transmit power may be a maximum transmit power value indicated by a maximum transmit power configured by a base station or a predefined maximum transmit power value.

The maximum transmit power may be represented as $P_{CMAX,c}$, $\hat{P}_{CMAX,c}$, $P_{CMAX}$, $P_{MAX}$, $P_{UMAX}$, $P_{EMAX}$, P-MAX, or the like. This is not limited in the present invention.

The maximum transmit power may be predefined, or may be configured by using signaling; or may be common in a cell, or may be user-specific. This is not limited in the present invention.

It should be noted that a value of a transmit power described in this embodiment of the present invention may be represented by using a logarithmic value (a unit may be dBm) or a linear value (a unit may be milliwatt mW, watt W). That is, the value may be a value for a single frequency-domain transmission resource (such as one PRB), or may be a value for an entire transmission bandwidth. Similarly, a power described in subsequent embodiments of the present invention may be determined to be a logarithmic value or a linear value based on a unit of the power. For example, $\hat{P}_{CMAX,c}$ is a linear value representing the maximum transmit power, and $P_{CMAX,c}$ is a logarithmic value representing the maximum transmit power. In the present invention, for another parameter x representing a power, $\hat{x}$ is used to represent a linear value of the parameter x, and x represents a logarithmic value of the parameter x.

It should be understood that a method for the UE to obtain the maximum transmit power includes obtaining the linear value or the logarithmic value of the maximum transmit power. This is not limited in the present invention.

In step 620, the first parameter includes the carrier type of the carrier of the first link, and the carrier type may be a first carrier type, or may be a second carrier type.

Optionally, a first-type carrier is determined based on at least one of the following characteristics: the carrier of the first link includes the first link and a second link; the carrier of the first link includes a reference signal used for determining a power control parameter; the type of the carrier of the first link is determined to be the first-type carrier based on indication information; or indication information for determining a transmit power parameter of the carrier of the first link is included.

Optionally, a second-type carrier is determined based on at least one of the following characteristics: the carrier of the first link includes only first link; the carrier of the first link does not include the reference signal used for determining the power control parameter; the indication information for determining the transmit power parameter of the carrier of the first link is not included; or the type of the carrier of the first link is determined to be the second-type carrier based on the indication information.

It should be understood that the reference signal used for determining the power control parameter may be any one or more of a CRS (cell-specific reference signal), a CSI-RS (channel state information-reference signal), a DMRS (demodulation reference signal), and the like. This is not limited in the present invention.

It should be further understood that the bandwidth of the data channel included in the first parameter is a transmission bandwidth for data transmission on the data channel, and the bandwidth of the control channel is a transmission bandwidth for data transmission on the control channel.

After the transmit power of the data channel and/or the transmit power of the control channel are/is determined based on the maximum transmit power and the first parameter, the data channel and the control channel are sent in the same subframe based on the determined transmit power of the data channel and/or transmit power of the control channel, respectively.

Therefore, in this embodiment of the present invention, when the data channel and the control channel are sent in the same subframe, the transmit power of the data channel and the transmit power of the control channel can be determined based on at least one of the maximum transmit power, the bandwidth of the data channel, the bandwidth of the control channel, or the carrier type of the carrier of the first link, to properly determine the transmit powers of control information and data.

Optionally, in an embodiment of the present invention, that the UE determines a transmit power of a data channel and/or a transmit power of a control channel based on the maximum transmit power and a first parameter includes: determining a power scaling factor based on a proportional relationship between a first power and the maximum transmit power, where the first power is a sum of a second power of the data channel and a third power of the control channel, the second power is determined based on the bandwidth of the data channel and/or the bandwidth of the control channel included in the first parameter, and the third power is determined based on the bandwidth of the data channel and/or the bandwidth of the control channel included in the first parameter; and determining the transmit power of the control channel and the transmit power of the data channel based on the scaling factor.

Optionally, in an embodiment of the present invention, the second power value of the data channel is a power value determined based on a path loss between the UE and a serving cell; or the second power value of the data channel is a smaller value of a maximum power value on the data channel and a power value determined based on a path loss between the UE and a serving cell; or the second power of the control channel is a power value determined based on the power value of the control channel and the bandwidths of the data channel and the control channel;

the second power of the control channel is a power value of the control channel determined based on the path loss between the UE and the serving cell; or the third power of the control channel is a power value determined based on the power value of the data channel and the bandwidths of the data channel and the control channel; or the third power value of the control channel is the smaller value of the maximum power value on the data channel and the power value of the data channel determined based on the path loss between the UE and the serving cell.

Optionally, it is assumed that the control channel is a PSCCH channel and the data channel is a PSSCH channel. The third power is represented as $P_{PSCCH\_0}$, and the second power is represented as $P_{PSSCH\_0}$.

In a mode 3, the transmit power $P_{PSSCH}$ of the data channel is determined based on the smaller value of the maximum power value on the service channel and the transmit power value determined based on the path loss, and is represented by using the following formula:

$$P_{PSSCH\_0} = \min\{P_{CMAX,PSSCH}, 10\log_{10}(M_{PSSCH}) + P_{O\_PSSCH,3} + \alpha_{PSSCH,3} \cdot PL\} \text{ [dBm]}$$

In the mode 3, the transmit power $P_{PSCCH}$ of the control channel is determined based on the power value of the data channel and the bandwidth values of the control channel and the service channel, and is represented by using the following formula:

$$P_{PSCCH\_0} = \min\{P_{CMAX,PSCCH}, 10\log_{10}(M_{PSCCH}) + P_{O\_PSCCH,3} + \alpha_{PSCCH,3} \cdot PL\} \text{ [dBm]};$$

or $$P_{PSCCH\_0} = P_{PSSCH\_0} + 10\log_{10}(M_{PSCCH}) - 10\log_{10}(M_{PSSCH}) + a \text{ [dBm]},$$

where a is a predefined constant. For example, a may be −3, 0, or 3. This is not limited herein.

In a mode 4, the transmit power $P_{PSSCH}$ of the data channel is determined based on the smaller value of the maximum power value on the data channel and the transmit power value determined based on the path loss, and is represented by using the following formula:

$$P_{PSSCH\_0} = \min\{P_{CMAX,PSSCH}, 10\log_{10}(M_{PSSCH}) + P_{O\_PSSCH,4} + \alpha_{PSSCH,4} \cdot PL\} \text{ [dBm]}$$

In the mode 4, the transmit power $P_{PSCCH}$ of the control channel is determined based on the power value of the data channel and the bandwidth values of the control channel and the data channel, and is represented by using the following formula:

$$P_{PSCCH\_0} = \min\{P_{CMAX,PSCCH}, 10\log_{10}(M_{PSCCH}) + P_{O\_PSCCH,4} \cdot PL\} \text{ [dBm]};$$

or $$P_{PSCCH\_0} = P_{PSSCH} + 10\log_{10}(M_{PSCCH}) - 10\log_{10}(M_{PSSCH}) + b \text{ [dBm]},$$

where b is a predefined constant. For example, b may be −3, 0, or 3. This is not limited herein.

Herein, the calculated third power $P_{PSCCH}$ and second power $P_{PSSCH}$ may be logarithmic power values.

In the preceding formulas, $M_{PSCCH}$ indicates the transmission bandwidth of the PSCCH channel, and $M_{PSSCH}$ indicates the transmission bandwidth of the PSSCH channel;

PL indicates a value of the path loss between the UE and the serving base station;

$\alpha_{PSCCH,3}$ and $\alpha_{PSSCH,3}$ indicate path loss compensation coefficients of the PSCCH channel and the PSSCH channel in the mode 3, respectively;

$\alpha_{PSCCH,4}$ and $\alpha_{PSSCH,4}$ indicate path loss compensation coefficients of the PSCCH channel and the PSSCH channel in the mode 4, respectively;

$P_{O\_PSCCH,4}$ and $P_{O\_PSSCH,3}$ indicate two power parameter values configured by the serving base station or predefined in the mode 3; and $P_{O\_PSCCH,4}$ and $P_{O\_PSSCH,4}$ indicate two power parameter values configured by the serving base station or predefined in the mode 4.

PL may be notified to the UE in a form of signaling after being determined by the serving base station, or may be determined by the UE. For a method for calculating the value of path loss, refer to the prior art. Details are not described herein.

In the mode 3, $\alpha_{PSCCH,3}$, $\alpha_{PSSCH,3}$, $P_{O\_PSCCH,3}$, and $P_{O\_PSSCH,3}$ may be notified by the serving base station to the UE in the form of signaling, or may be predefined. For example, before S610, configuration information sent by the serving base station includes values of $\alpha_{PSCCH,3}$, $\alpha_{PSSCH,3}$, $P_{O\_PSCCH,3}$, and $P_{O\_PSSCH,3}$. In the mode 4, the method is similar to that of the mode 3, and details are not repeated herein.

Herein, the transmission mode 3 and the transmission mode 4 are different transmission modes on the first link. For example, the transmission modes may be corresponding to transmissions, on the first link, based on scheduling by the base station, or transmissions, on the first link, based on resource selection by the UE.

Optionally, in an embodiment of the present invention, the determining a power scaling factor based on a proportional relationship between a first power and the maximum transmit power includes: determining a ratio of the maximum transmit power to the first power; and determining a smaller value of the ratio and 1 as a value of the scaling factor.

Optionally, if the ratio of the maximum transmit power to the first power is represented as a ratio of the maximum transmit power to the first transmit power, the ratio may be represented as $\hat{P}_{CMAX,c}/(\hat{P}_{PSCCH\_0}+\hat{P}_{PSSCH\_0})$.

Optionally, the scaling factor w is determined according to the following formula:

$$w=\min\{1,\hat{P}_{CMAX,c}/(\hat{P}_{PSCCH\_0}+\hat{P}_{PSSCH\_0})\}.$$

Optionally, in an embodiment of the present invention, the determining the transmit power of the control channel and/or the transmit power of the data channel based on the power scaling factor includes: using a product of the power scaling factor and the second power as the transmit power of the data channel; and using a product of the power scaling factor and the third power as the transmit power of the control channel.

Optionally, the transmit power of the data channel is obtained by multiplying the scaling factor and a linear value of the second power, and the transmit power of the control channel is obtained by multiplying the scaling factor and a linear value of the third power. For example, the transmit power of the data channel and the transmit power of the control channel are determined according to the following formulas:

$$\hat{P}_{PSSCH}=w\cdot\tilde{P}_{PSSCH\_0};$$

and $$\hat{P}_{PSCCH}=w\cdot\tilde{P}_{PSCCH\_0}.$$

In the preceding formulas, w indicates the scaling factor, $\hat{P}_{PSSCH}$ indicates a linear value of the transmit power of the data channel, $\hat{P}_{PSCCH}$ indicates a linear value of the transmit power of the control channel, $\tilde{P}_{PSSCH\_0}$ indicates the linear value of the second power of the data channel, and $\tilde{P}_{PSCCH\_0}$ indicates the linear value of the third power of the control channel.

Optionally, in an embodiment of the present invention, before the determining, by the UE, a transmit power of a data channel and a transmit power of a control channel based on the maximum transmit power and a first parameter, the method further includes: determining that the carrier of the first link is the first-type carrier or the second-type carrier.

When the carrier of the first link is the first-type carrier, the UE determines the transmit power of the data channel and the transmit power of the control channel based on the maximum transmit power and the first parameter.

In other words, when the carrier of the first link is determined to be the first-type carrier, the UE may determine the transmit power of the data channel and the transmit power of the control channel based on the maximum transmit power and the first parameter according to the method described in the foregoing embodiment.

Optionally, in an embodiment of the present invention, the second-type carrier, the first parameter includes the carrier type of the carrier of the first link, and the determining, by the UE, a transmit power of a data channel and a transmit power of a control channel based on the maximum transmit power and a first parameter includes: when the carrier of the first link is the second-type carrier, determining the maximum transmit power of the data channel as the transmit power of the data channel; and determining the transmit power of the control channel based on the transmit power of the data channel, the bandwidth of the data channel, and the bandwidth of the control channel; or determining a maximum transmit power of the control channel as the maximum transmit power of the control channel.

Optionally, in the mode 3 and the mode 4, the transmit power $P_{PSSCH}$ of the data channel is determined based on the maximum transmit power on the data channel, and is represented by using the following formula:

$$P_{PSSCH}=P_{CMAX,PSSCH} \text{ [dBm]}$$

In the mode 3 and the mode 4, the transmit power $P_{PSCCH}$ of the control channel is determined based on the power value of the data channel and the bandwidth values of the control channel and the data channel, and for example, is represented by using the following formula:

$$P_{PSCCH}=P_{PSSCH}+10\log_{10}(M_{PSCCH})-10\log_{10}(M_{PSSCH})+a \text{ [dBm]},$$

where a is a constant. For example, a may be 0, 3, 6, or −3. This is not limited herein.

Alternatively, optionally, in the mode 3 and the mode 4, the transmit power $P_{PSCCH}$ of the control channel is determined based on the maximum transmit power on the control channel, and for example, is represented by using the following formula:

$$P_{PSSCH}=P_{CMAX,PSCCH} \text{ [dBm]}$$

Herein, $P_{CMAX,PSCCH}$ and $P_{CMAX,PSSCH}$ represent values of the maximum transmit powers on the PSCCH and PSSCH channels, respectively. The values may be predefined, or may be configured by using signaling; and may be common in a cell, or may be user-specific.

Optionally, in an embodiment of the present invention, the first parameter includes the transmission bandwidth of the control channel and the transmission bandwidth of the data channel, and the determining, by the UE, a transmit power of a data channel and a transmit power of a control channel based on the maximum transmit power and a first parameter includes:

determining whether a first power is greater than the maximum transmit power, where the first power is a sum of a second power of the data channel and a third power of the control channel; and when the first power is greater than the maximum transmit power, determining the transmit power of the data channel based on the maximum transmit power, the transmission bandwidth of the control channel, and the transmission bandwidth of the data channel; and determining the transmit power of the control channel based on the maximum transmit power, the transmission bandwidth of the control channel, and the transmission bandwidth of the data channel; or determining the transmit power of the control channel based on the transmit power of the data channel, the transmission bandwidth of the control channel, and the transmission bandwidth of the data channel.

Optionally, a determining basis is to determine whether a sum of linear values of the second power of the data channel and the third power of the control channel is less than the maximum transmit power value. For example:

$$\hat{P}_{PSCCH\_0} + \hat{P}_{PSSCH\_0} \leq \hat{P}_{CMAX,c}$$

If the foregoing formula holds, it indicates that the transmit power does not exceed the maximum power value; otherwise, it indicates that the transmit power exceeds the maximum transmit power.

Optionally, if the transmit power does not exceed the maximum power value, the transmit powers of the data channel and the control channel are determined in the following manner.

In a mode 3, the transmit power $P_{PSSCH}$ of the data channel is determined based on the smaller value of the maximum power value on the service channel and the transmit power value determined based on the path loss, and is represented by using the following formula:

$$P_{PSSCH} = \min\{P_{CMAX,PSSCH}, 10 \log_{10}(M_{PSSCH}) + P_{O\_PSSCH,3} + \alpha_{PSSCH,3} \cdot PL\} \text{ [dBm]}$$

In the mode 3, the transmit power $P_{PSCCH}$ of the control channel is determined based on the power value of the data channel and the bandwidth values of the control channel and the service channel, and is represented by using the following formula:

$$P_{PSCCH} = \min\{P_{CMAX,PSCCH}, 10 \log_{10}(M_{PSCCH}) + P_{O\_PSCCH,3} + \alpha_{PSCCH,3} \cdot PL\} \text{ [dBm]};$$

or $$P_{PSCCH} = P_{PSSCH} + 10 \log_{10}(M_{PSCCH}) - 10 \log_{10}(M_{PSSCH}) + a \text{ [dBm]},$$

where a is a predefined constant. For example, a may be −3, 0, or 3. This is not limited herein.

In a mode 4, the transmit power $P_{PSSCH}$ of the data channel is determined based on the smaller value of the maximum power value on the data channel and the transmit power value determined based on the path loss, and is represented by using the following formula:

$$P_{PSSCH} = \min\{P_{CMAX,PSSCH}, 10 \log_{10}(M_{PSSCH}) + P_{O\_PSSCH,4} + \alpha_{PSSCH,4} \cdot PL\} \text{ [dBm]}$$

In the mode 4, the transmit power $P_{PSCCH}$ of the control channel is determined based on the power value of the data channel and the bandwidth values of the control channel and the data channel, and is represented by using the following formula:

$$P_{PSCCH} = \min\{P_{CMAX,PSCCH}, 10 \log_{10}(M_{PSCCH}) + P_{O\_PSCCH,4} + \alpha_{PSCCH,4} \cdot PL\} \text{ [dBm]};$$

or $$P_{PSCCH} = P_{PSSCH} + 10 \log_{10}(M_{PSCCH}) - 10 \log_{10}(M_{PSSCH}) + b \text{ [dBm]},$$

where b is a predefined constant. For example, b may be −3, 0, or 3. This is not limited herein.

Herein, the calculated transmit power $P_{PSCCH}$ of the control channel and transmit power $P_{PSSCH}$ of the data channel may be a logarithmic power value.

Optionally, if the transmit power exceeds the maximum power value, when the first power is greater than the maximum transmit power, the determining the transmit power of the data channel based on the maximum transmit power, the transmission bandwidth of the control channel, and the transmission bandwidth of the data channel and the determining the transmit power of the control channel based on the maximum transmit power, the transmission bandwidth of the control channel, and the transmission bandwidth of the data channel further include:

determining the transmit power of the control channel and the transmit power of the data channel based on a sum of the maximum transmit power and a first additional item, where the first additional item is determined based on the bandwidth of the control channel and the bandwidth of the data channel.

Specifically, for the data channel, the first additional item may be represented in any one of the following forms:

$$10 \log_{10}\left(\frac{M_{PSSCH}}{2M_{PSCCH} + M_{PSSCH}}\right);$$

$$10 \log_{10}\left(\frac{1}{1 + M_{PSSCH}/(2M_{PSCCH})}\right);$$

$$-10 \log_{10}(1 + M_{PSSCH}/(2M_{PSCCH}));$$

$$10 \log_{10}\left(\frac{M_{PSCCH}}{M_{PSCCH} + M_{PSSCH}}\right);$$

$$10 \log_{10}\left(\frac{1}{1 + M_{PSSCH}/M_{PSCCH}}\right); \text{ and}$$

$$-10 \log_{10}(1 + M_{PSSCH}/M_{PSCCH}).$$

It should be understood that the representation form of the first additional item is not limited thereto.

Generally, the transmit power of the data channel determined based on a sum of the maximum transmit power and a first additional item may be represented by using the following formula:

$$P_{CMAX,c} + 10 \log_{10}\left(\frac{b \cdot M_{PSSCH}}{a \cdot M_{PSCCH} + b \cdot M_{PSSCH}}\right); \text{ or}$$

$$P_{CMAX,c} + 10 \log_{10}(b \cdot M_{PSSCH}) - 10 \log_{10}(a \cdot M_{PSCCH} + b \cdot M_{PSSCH}); \text{ or}$$

$$P_{CMAX,c} + 10 \log_{10}(M_{PSSCH}) -$$
$$\qquad 10 \log_{10}(a \cdot M_{PSCCH} + b \cdot M_{PSSCH}) + 10 \log_{10}(b); \text{ or}$$

$$P_{CMAX,c} - 10 \log_{10}(1 + (a \cdot M_{PSCCH})/(b \cdot M_{PSSCH})),$$

where a and b are non-negative integers.

Optionally, the transmit power of the control channel determined based on a sum of the maximum transmit power and a first additional item may be represented by using one of the following formulas:

$$P_{CMAX,c} + 10 \log_{10}\left(\frac{2M_{PSCCH}}{2M_{PSCCH} + M_{PSSCH}}\right);$$

-continued $P_{CMAX,c} + 10 \log_{10}\left(\frac{1}{1 + M_{PSSCH}/(2M_{PSCCH})}\right);$ $P_{CMAX,c} - 10 \log_{10}(1 + M_{PSSCH}/(2M_{PSCCH}));$ $P_{CMAX,c} + 10 \log_{10}\left(\frac{M_{PSSCH}}{M_{PSCCH} + M_{PSSCH}}\right);$ $P_{CMAX,c} + 10 \log_{10}\left(\frac{1}{1 + M_{PSCCH}/M_{PSSCH}}\right);$ $P_{CMAX,c} - 10 \log_{10}(1 + M_{PSCCH}/M_{PSSCH});$ $P_{CMAX,c} + 10 \log_{10}\left(\frac{a \cdot M_{PSCCH}}{a \cdot M_{PSCCH} + b \cdot M_{PSSCH}}\right);$ $P_{CMAX,c} - 10 \log_{10}(1 + (b \cdot M_{PSSCH})/(a \cdot M_{PSCCH}));$ $P_{CMAX,c} + 10 \log_{10}(a \cdot M_{PSCCH}) - 10 \log_{10}(a \cdot M_{PSCCH} + b \cdot M_{PSSCH});$ and $P_{CMAX,c} + 10 \log_{10}(M_{PSCCH}) -$
$\qquad 10 \log_{10}(a \cdot M_{PSCCH} + b \cdot M_{PSSCH}) + 10 \log_{10}(a),$ where a and b are positive integers.

Optionally, in an embodiment of the present invention, the determining, by the UE, a transmit power of a data channel based on the maximum transmit power and a first parameter includes: determining whether a first power is greater than the maximum transmit power, where the first power is a sum of a second power of the data channel and a third power of the control channel; and when the first power is greater than the maximum power, determining the transmit power of the data channel based on a scaling factor and the second power, and determining the transmit power of the control channel based on the scaling factor and the third power, where the scaling factor is not greater than a ratio of the maximum transmit power to the first power.

Optionally, in an embodiment of the present invention, when the first transmit power is greater than the maximum transmit power, the determining the transmit power of the data channel based on a scaling factor and the second power includes: determining a product of the scaling factor and the second power as the transmit power of the data channel; and the determining the transmit power of the control channel based on the scaling factor and the third power includes: determining a product of the scaling factor and the third power as the transmit power of the control channel.

Similarly, a determining basis is to determine whether a sum of linear values of the second power of the data channel and the third power of the control channel is less than the maximum transmit power value. For example:

$\hat{P}_{PSCCH\_0} + \hat{P}_{PSSCH\_0} \leq \hat{P}_{CMAX,c}$

If the foregoing formula holds, it indicates that the sum of the linear values of the second power of the data channel and the third power of the control channel does not exceed the maximum power value; otherwise, it indicates that the transmit power exceeds the maximum transmit power.

Optionally, if the transmit power does not exceed the maximum power value, the transmit powers of the data channel and the control channel are determined in the following manner.

In a mode 3, the transmit power $P_{PSSCH}$ of the data channel is determined based on the smaller value of the maximum power value on the service channel and the transmit power value determined based on the path loss, and is represented by using the following formula:

$P_{PSSCH} = \min\{P_{CMAX,PSSCH}, 10 \log_{10}(M_{PSSCH}) + P_{O\_P-}$
$\qquad SSCH,3 + \alpha_{PSSCH,3} \cdot PL\}$ [dBm]

In the mode 3, the transmit power $P_{PSCCH}$ of the control channel is determined based on the power value of the data channel and the bandwidth values of the control channel and the service channel, and is represented by using the following formula:

$P_{PSCCH} = \min\{P_{CMAX,PSCCH}, 10 \log_{10}(M_{PSCCH}) + P_{O\_P-}$
$\qquad SCCH,3 + \alpha_{PSCCH,3} \cdot PL\}$ [dBm];

or $P_{PSCCH} = P_{PSSCH} + 10 \log_{10}(M_{PSCCH}) - 10 \log_{10}$
$\qquad (M_{PSSCH}) + a$ [dBm], where a is a predefined constant. For example, a may be −3, 0, or 3. This is not limited herein.

In a mode 4, the transmit power $P_{PSSCH}$ of the data channel is determined based on the smaller value of the maximum power value on the data channel and the transmit power value determined based on the path loss, and is represented by using the following formula:

$P_{PSSCH} = \min\{P_{CMAX,PSSCH}, 10 \log_{10}(M_{PSSCH}) + P_{O\_P-}$
$\qquad SSCH,4 + \alpha_{PSSCH,4} \cdot PL\}$ [dBm]

In the mode 4, the transmit power $P_{PSCCH}$ of the control channel is determined based on the power value of the data channel and the bandwidth values of the control channel and the data channel, and is represented by using the following formula:

$P_{PSCCH} = \min\{P_{CMAX,PSCCH}, 10 \log_{10}(M_{PSCCH}) + P_{O\_P-}$
$\qquad SCCH,4 + \alpha_{PSCCH,4} \cdot PL\}$ [dBm];

or $P_{PSCCH} = P_{PSSCH} + 10 \log_{10}(M_{PSCCH}) - 10 \log_{10}$
$\qquad (M_{PSSCH}) + b$ [dBm], where b is a predefined constant. For example, b may be −3, 0, or 3. This is not limited herein.

Herein, the calculated transmit power $P_{PSCCH}$ of the control channel and transmit power $P_{PSSCH}$ of the data channel may be a logarithmic power value.

Optionally, if the sum of the linear values of the third power of the control channel and the second power of the data channel exceeds the maximum transmit power, w is determined in the following manner:

$w \cdot (\hat{P}_{PSCCH} + \hat{P}_{PSSCH}) \leq \hat{P}_{CMAX,c},$ where $0 < w \leq 1$.

Optionally, the transmit power of the data channel and the transmit power of the control channel are determined according to the following formulas:

$\hat{P}_{PSSCH} = w \cdot \hat{P}_{PSSCH\_0};$ and $\hat{P}_{PSCCH} = w \cdot \hat{P}_{PSCCH\_0}.$ In the preceding formulas, w(i) indicates the scaling factor, $\hat{P}_{PSSCH}$ indicates a linear value of the transmit power of the data channel, $\hat{P}_{PSCCH}$ indicates a linear value of the transmit power of the control channel, $\hat{P}_{PSSCH\_0}$ indicates a linear value of the second power of the data channel, and $\hat{P}_{PSCCH\_0}$ indicates a linear value of the third power of the control channel.

Optionally, in an embodiment of the present invention, when the control channel and the data channel are not transmitted simultaneously on a same time domain resource, for example, transmitted in different subframes, the transmit power values are determined for the control channel and the data channel in the following manners:

Manner 1: The transmit power values of the control channel and the data channel are respectively set to the maximum transmit power values on the corresponding channels. For example:

$$P_{PSCCH} = P_{CMAX,PSCCH};$$

and $$P_{PSSCH} = P_{CMAX,PSSCH}.$$

Manner 2: The transmit power value of the data channel is set to the maximum transmit power value on the corresponding channel, and the transmit power value of the control channel is set based on the power value of the data channel and the bandwidths of the control channel and the data channel. For example:

$$P_{PSSCH} = P_{CMAX,PSSCH};$$

and $$P_{PSCCH} = P_{PSSCH} + 10 \log_{10}(M_{PSCCH}) - 10 \log_{10}(M_{PSSCH}) + \Delta.$$

In the preceding formulas, $\Delta$ is a constant, and the manner 1 and the manner 2 may be used for the first-type carrier and/or the second-type carrier, and preferably, are applicable to the first-type carrier.

The foregoing describes the network slice management method and the network management architecture in the embodiments of the present invention in detail with reference to FIG. 1 to FIG. 6. The following describes a terminal device in the embodiments of the present invention in detail with reference to FIG. 7 and FIG. 8.

Figure 7:
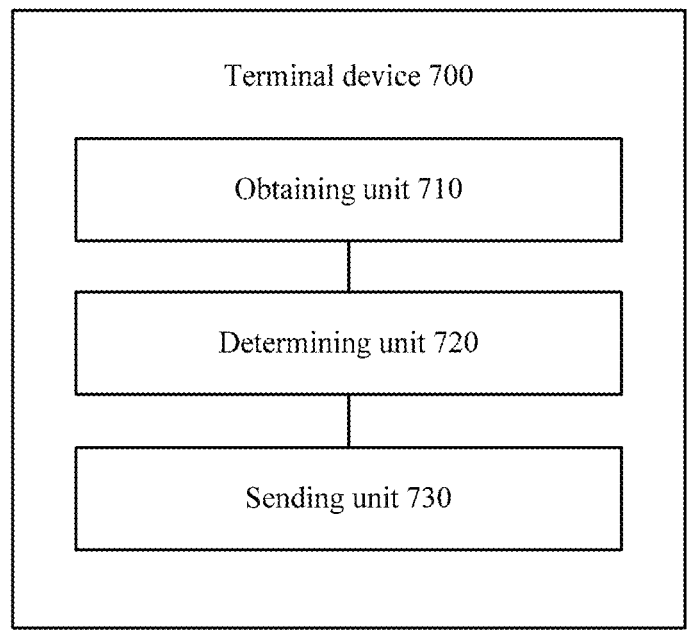
FIG. 7 is a schematic block diagram of a terminal device according to an embodiment of the present invention.

FIG. 7 is a block diagram of a structure of a terminal device according to an embodiment of the present invention. It should be understood that the terminal device 700 can perform the steps performed by the terminal device in the method of FIG. 1 to FIG. 6. To avoid repetition, details are not described herein. The terminal device 700 includes:

an obtaining unit 710, configured to obtain a maximum transmit power;

a determining unit 720, configured to determine a transmit power of a data channel and/or a transmit power of a control channel based on the maximum transmit power and a first parameter, where the first parameter includes at least one of the following: a bandwidth of the data channel, a bandwidth of the control channel, or a carrier type of a carrier of a first link; and a sending unit 730, configured to send the control channel and the data channel in a same subframe.

Therefore, in this embodiment of the present invention, when the data channel and the control channel are sent in the same subframe, the transmit power of the data channel and the transmit power of the control channel can be determined based on at least one of the maximum transmit power, the bandwidth of the data channel, the bandwidth of the control channel, or the carrier type of the carrier of the first link, to properly determine the transmit powers of control information and data.

Figure 8:
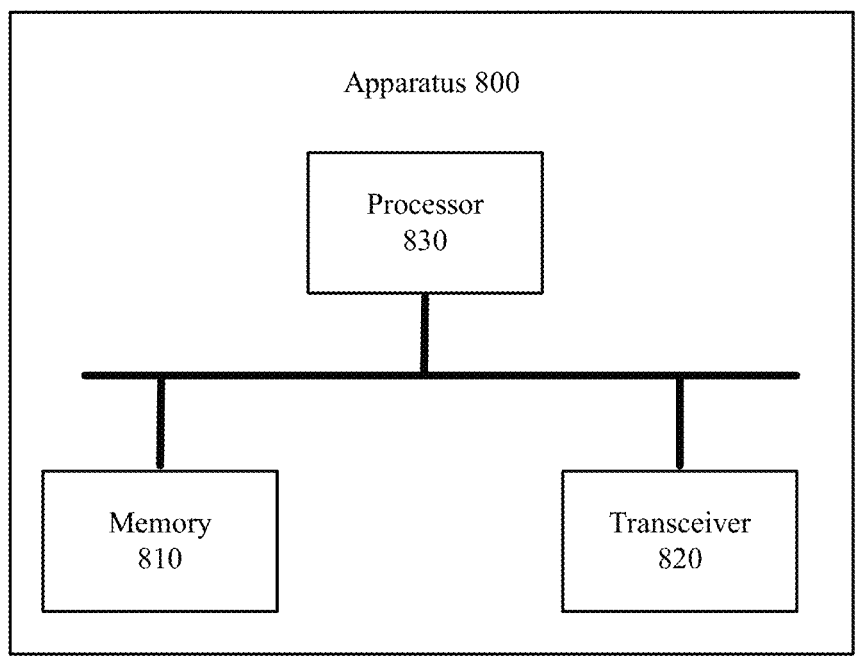
FIG. 8 is a schematic block diagram of an apparatus according to an embodiment of the present invention.

FIG. 8 is a schematic structural diagram of an apparatus according to an embodiment of the present invention. FIG. 8 shows the apparatus 800 provided in this embodiment of the present invention. It should be understood that the apparatus 800 can perform the steps performed by the user equipment in the method of FIG. 1 to FIG. 6. To avoid repetition, details are not described herein. The apparatus 800 includes:

a memory 810, configured to store a program;

a transceiver 820, configured to communicate with another device; and a processor 830, configured to execute the program in the memory 810, where when the program is executed, the processor 830 is configured to receive and/or send a signal by using the transceiver 820, to obtain a maximum transmit power; the processor 830 is further configured to determine a transmit power of a data channel and/or a transmit power of a control channel based on the maximum transmit power and a first parameter, where the first parameter includes at least one of the following: a bandwidth of the data channel, a bandwidth of the control channel, or a carrier type of a carrier of a first link; and the transceiver 820 is further configured to send the control channel and the data channel in a same subframe.

It should be understood that the apparatus 800 may be specifically the user equipment in the foregoing embodiments, and may be configured to perform the steps and/or procedures corresponding to the user equipment in the foregoing method embodiments.

Therefore, in this embodiment of the present invention, when the data channel and the control channel are sent in the same subframe, the transmit power of the data channel and the transmit power of the control channel can be determined based on at least one of the maximum transmit power, the bandwidth of the data channel, the bandwidth of the control channel, or the carrier type of the carrier of the first link, to properly determine the transmit powers of control information and data.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not repeated herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some characteristics may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
   obtaining, by an apparatus, a maximum transmit power;
   determining, by the apparatus, a transmit power of a data channel based on a sum of the maximum transmit power and a first additional item, wherein the first additional item is determined based on a bandwidth of a control channel and a bandwidth of the data channel;
   determining, by the apparatus, a transmit power of a control channel based on a sum of the maximum transmit power and a second additional item, wherein the second additional item is determined based on the bandwidth of the control channel and the bandwidth of the data channel; and
   sending, by the apparatus, the control channel and the data channel in a same subframe.

2. The method according to claim 1, wherein the maximum transmit power is a maximum transmit power value configured by a base station or a predefined maximum transmit power value.

3. The method according to claim 1, wherein the second additional item equals to:

$$10\log_{10}\left(\frac{\alpha \cdot M_{PSSCH}}{\alpha \cdot M_{PSCCH} + b \cdot M_{PSSCH}}\right),$$

wherein $M_{PSCCH}$ indicates the bandwidth of the control channel and $M_{PSSCH}$ indicates the bandwidth of the data channel, and a and b are predefined constants.

4. The method according to claim 3, wherein the control channel is a physical sidelink control channel (PSCCH) and the data channel is a physical sidelink shared channel (PSSCH).

5. The method according to claim 3, wherein the transmit power of the control channel equals to:

$$P_{CMAX,c} + 10\log_{10}\left(\frac{\alpha \cdot M_{PSCCH}}{\alpha \cdot M_{PSCCH} + b \cdot M_{PSSCH}}\right),$$

wherein $P_{CMAX,c}$ is the maximum transmit power.

6. The method according to claim 1, wherein the apparatus comprises a terminal device.

7. The method according to claim 1, wherein the first additional item equals to:

$$10\log_{10}\left(\frac{b \cdot M_{PSSCH}}{a \cdot M_{PSCCH} + b \cdot M_{PSSCH}}\right),$$

wherein $M_{PSCCH}$ indicates the bandwidth of the control channel, $M_{PSSCH}$ indicates the bandwidth of the data channel, and a and b are predefined constants.

8. The method according to claim 7, wherein the transmit power of the data channel equals to:

$$P_{CMAX,c} + 10\log_{10}\left(\frac{\alpha \cdot M_{PSCCH}}{\alpha \cdot M_{PSCCH} + b \cdot M_{PSSCH}}\right),$$

wherein $P_{CMAX,c}$ is the maximum transmit power.

9. An apparatus, comprising:
   at least one processor; and
   a non-transitory computer-readable storage medium coupled to the at least one processor and storing programming instructions for execution by the at least one processor, wherein the programming instructions instruct the at least one processor to:
   obtain a maximum transmit power;
   determine a transmit power of a data channel based on a sum of the maximum transmit power and a first additional item, wherein the first additional item is determined based on a bandwidth of a control channel and a bandwidth of the data channel;
   determine a transmit power of the control channel based on a sum of the maximum transmit power and a second additional item, wherein the second additional item is determined based on the bandwidth of the control channel and the bandwidth of the data channel; and
   cause a transceiver to send the control channel and the data channel in a same subframe.

10. The apparatus according to claim 9, wherein the maximum transmit power is a maximum transmit power value configured by a base station or a predefined maximum transmit power value.

11. The apparatus according to claim 9, wherein the second additional item equals to:

$$P_{CMAX,c} + 10\log_{10}\left(\frac{\alpha \cdot M_{PSCCH}}{\alpha \cdot M_{PSCCH} + b \cdot M_{PSSCH}}\right),$$

wherein $M_{PSCCH}$ indicates the bandwidth of the control channel, $M_{PSSCH}$ indicates the bandwidth of the data channel, and a and b are predefined constants.

12. The apparatus according to claim 11, wherein the control channel is a physical sidelink control channel, PSCCH, and the data channel is a physical sidelink shared channel, PSSCH.

13. The apparatus according to claim 11, wherein the transmit power of the control channel equals to:

$$P_{CMAX,c} + 10 \log_{10}\left(\frac{\alpha \cdot M_{PSCCH}}{\alpha \cdot M_{PSCCH} + b \cdot M_{PSSCH}}\right).$$

wherein $P_{CMAX,c}$ is the maximum transmit power.

14. The apparatus according to claim 9, wherein the apparatus comprises a terminal device.

15. The apparatus according to claim 9, wherein the first additional item equals to:

$$10\log_{10}\left(\frac{b \cdot M_{PSSCH}}{a \cdot M_{PSCCH} + b \cdot M_{PSSCH}}\right),$$

wherein $M_{PSCCH}$ indicates the bandwidth of the control channel, $M_{PSSCH}$ indicates the bandwidth of the data channel, and a and b are predefined constants.

16. The apparatus according to claim 15, wherein the transmit power of the data channel determined equals to:

$$P_{CMAX,c} + 10\log_{10}\left(\frac{b \cdot M_{PSSCH}}{a \cdot M_{PSCCH} + b \cdot M_{PSSCH}}\right),$$

wherein $P_{CMAX,c}$ is the maximum transmit power.

17. A non-transitory computer readable storage medium, comprising computer program codes which when executed by at least one processor cause a terminal device to perform the steps of:
    obtaining a maximum transmit power;
    determining a transmit power of a data channel based on a sum of the maximum transmit power and a first additional item, wherein
    the first additional item is determined based on a bandwidth of a control channel and a bandwidth of the data channel;
    determining a transmit power of a control channel based on a sum of the maximum transmit power and a second additional item, wherein
    the second additional item is determined based on the bandwidth of the control channel and the bandwidth of the data channel; and
    sending the control channel and the data channel in a same subframe.

18. The non-transitory computer readable storage medium according to claim 17, wherein the maximum transmit power is a maximum transmit power value configured by a base station or a predefined maximum transmit power value.

19. The non-transitory computer readable storage medium according to claim 17, wherein the second additional item equals to:

$$10 \log_{10}\left(\frac{\alpha \cdot M_{PSSCH}}{\alpha \cdot M_{PSCCH} + b \cdot M_{PSSCH}}\right),$$

wherein $M_{PSCCH}$ indicates the bandwidth of the control channel, $M_{PSSCH}$ indicates the bandwidth of the data channel, and a and b are predefined constants.

20. The non-transitory computer readable storage medium according to claim 19, wherein the control channel is a physical sidelink control channel, PSCCH, and the data channel is a physical sidelink shared channel, PSSCH.

* * * * *

UNITED STATES PATENT AND TRADEMARK OFFICE
CERTIFICATE OF CORRECTION

PATENT NO. : 10,764,831 B2  
APPLICATION NO. : 16/368712  
DATED : September 1, 2020  
INVENTOR(S) : Chao Li and Xingwei Zhang Page 1 of 1

It is certified that error appears in the above-identified patent and that said Letters Patent is hereby corrected as shown below:

In the Claims

In Column 19, Line 64-66, in Claim 3, delete "$10 \log_{10}\left(\frac{\alpha \cdot M_{PSSCH}}{\alpha \cdot M_{PSCCH} + b \cdot M_{PSSCH}}\right),$" and insert -- $10 \log_{10}\left(\frac{\alpha \cdot M_{PSCCH}}{\alpha \cdot M_{PSCCH} + b \cdot M_{PSSCH}}\right),$ --, therefor.

In Column 20, Line 31-33, in Claim 8, delete "$P_{CMAX,c} + 10 \log_{10}\left(\frac{\alpha \cdot M_{PSCCH}}{\alpha \cdot M_{PSCCH} + b \cdot M_{PSSCH}}\right),$" and insert -- $P_{CMAX,c} + 10 \log_{10}\left(\frac{b \cdot M_{PSSCH}}{\alpha \cdot M_{PSCCH} + b \cdot M_{PSSCH}}\right),$ --, therefor.

In Column 20, Line 64-66, in Claim 11, delete "$P_{CMAX,c} + 10 \log_{10}\left(\frac{\alpha \cdot M_{PSCCH}}{\alpha \cdot M_{PSCCH} + b \cdot M_{PSSCH}}\right),$" and insert -- $10 \log_{10}\left(\frac{\alpha \cdot M_{PSCCH}}{\alpha \cdot M_{PSCCH} + b \cdot M_{PSSCH}}\right),$ --, therefor.

In Column 22, Line 27-29, in Claim 19, delete "$10 \log_{10}\left(\frac{\alpha \cdot M_{PSSCH}}{\alpha \cdot M_{PSCCH} + b \cdot M_{PSSCH}}\right),$" and insert -- $10 \log_{10}\left(\frac{\alpha \cdot M_{PSCCH}}{\alpha \cdot M_{PSCCH} + b \cdot M_{PSSCH}}\right),$ --, therefor.

Signed and Sealed this  
Fifth Day of January, 2021

Andrei Iancu  
*Director of the United States Patent and Trademark Office*